Feb. 12, 1957 V. F. RAGNI 2,781,419
STABILIZED DIRECT CURRENT AMPLIFIER
Filed June 18, 1953
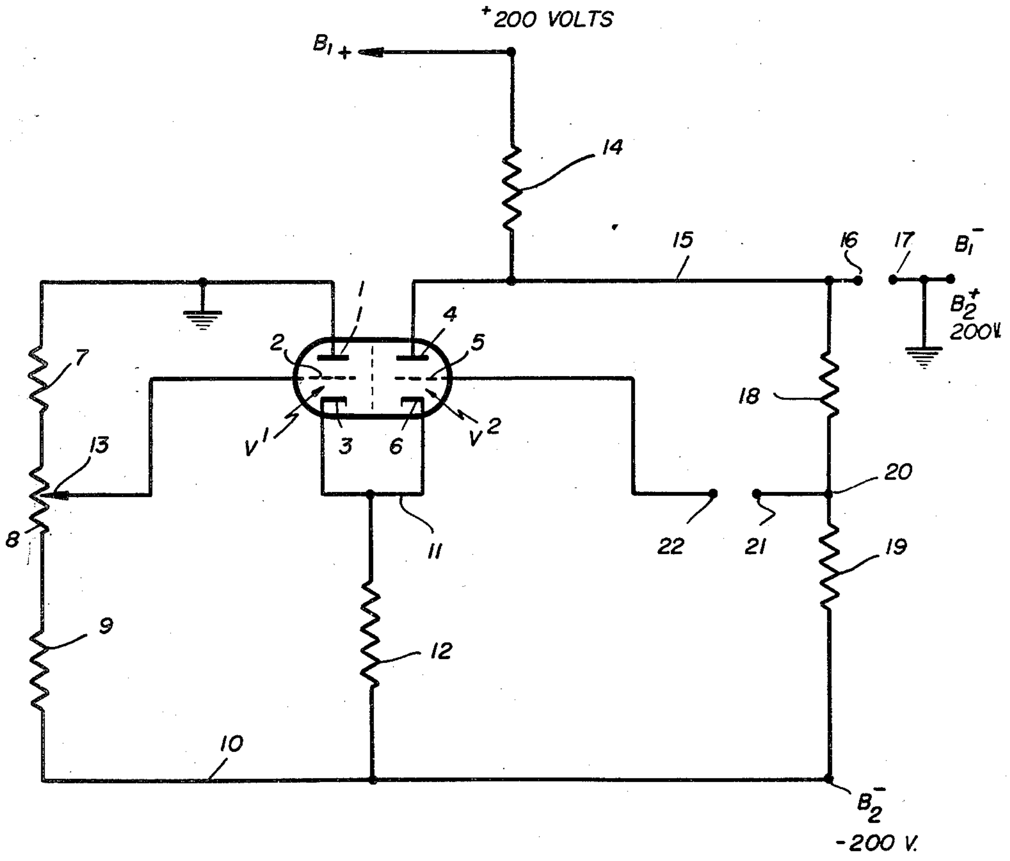
INVENTOR.
VICTOR F. RAGNI
BY
Lockwood, Galt, Woodard, & Smith
ATTORNEYS 2,781,419

STABILIZED DIRECT CURRENT AMPLIFIER

Victor F. Ragni, Bethpage, N. Y., assignor to International Telephone and Telegraph Corporation, a corporation of Maryland Application June 18, 1953, Serial No. 362,437

6 Claims. (Cl. 179—171)

The present invention relates to direct current amplifiers, and more particularly to a circuit for stabilizing direct current amplifiers against output signal changes which occur in conventional amplifier systems as the result of variations in circuit or tube constants or externally applied voltages.

In the use of amplifiers for amplifying direct current signals, it is often encountered that an output signal will not correspond accurately to the parameter of the input signal. A number of reasons have been evolved heretofore for this instability, these reasons including such things as changes in power supply voltage, changes in cathode temperature and emission changes in values of circuit resistances, and other changes well known to the art. In certain applications of direct current amplifiers, it is necessary that a zero voltage signal fed into the amplifier be followed by a zero voltage signal which appears at the output circuit. In the use of unstabilized amplifiers, a measurable voltage output signal is usually produced even with a zero voltage signal input, and for purposes of convenient reference, this measurable voltage may be characterized as "drift" voltage.

In view of the foregoing, it is an object of this invention to provide a direct current amplifier which is stabilized against the changes which are usually encountered in amplifier circuits, and to provide a stable amplifier circuit which will produce a signal output corresponding accurately to a given signal input.

It is another object of this invention to provide a circuit network which incorporates a direct current amplifier in combination with a compensating tube circuit operative to stabilize the network against changes in cathode emission of the amplifier tube.

It is another object of this invention to provide an amplifier circuit incorporating a negative feedback network which is operative to stabilize the circuit against changes in anode supply potential.

It is still another object of this invention to provide a direct current amplifier circuit which incorporates a symmetrical system of component parts and of voltages whereby slight changes in the circuit parameters will not produce objectionable variations in the parameter of the output signal.

It is yet another object of this invention to provide a stabilized D. C. amplifier having a high impedance input circuit and a low impedance output circuit.

In accordance with the present invention there is provided an amplifier comprising two triode tube sections, one of the sections being used as the primary amplifier, and the other tube serving as a compensating or control device. In general, the compensating tube provides stability against changes in the overall circuit which disturbs cathode emission. In addition a feedback network used in conjunction with the amplifier tube serves primarily to compensate for variations in the output signal which are ostensibly caused by anode supply potential changes.

For a better understanding of the invention, together with other and further objects thereof, reference is made to the following description taken in connection with the accompanying drawing and its scope will be pointed out in the appended claims.

The drawing is a circuit diagram of one embodiment of this invention.

In the drawing, a dual triode comprised of sections V1 and V2 is shown as a preferred arrangement for achieving more consistently the desired end results of this invention. The primary reason for using a dual triode tube is that in commercial practice the two sections more nearly correspond in the electrical characteristics thereof, and it has been found, that the more nearly identical the two sections are, the more stable are the results achieved.

It is of course possible to use separate triode tubes, and to make external circuit compensations which tend to make the two tubes appear to the associated circuitry as being electrically identical.

The compensating section V1 is composed of three electrodes, an anode 1, a control grid 2 and a cathode 3. The amplifier section V2 is provided with an anode 4, a control grid 5 and a cathode 6. A voltage divider circuit made up of three resistors 7, 8 and 9, connected in series, extend from the anode 1 to a line 10 which is connected to, for example, a source $B_2-$ of negative potential having a value of 200 volts. The cathodes 3 and 6 are connected together by a wire 11 which is coupled to the bus bar 10 through a cathode resistor 12. The control grid 2 is coupled to the resistor 8 by means of a variable tap 13 by which the normal biasing potential on the control grid 2 may be controlled.

A positive source $B_1+$ of potential of, for example, 200 volts is connected to the anode 4 of tube section V2 by means of an anode resistor 14, and a line 15 leads from this anode 4 to a terminal 16 of the output circuit. The other terminal 17 of this output circuit is grounded, and is therefore at the same potential as the anode 1 of the tube V1. Potential sources designated in the drawings as $B_1-$ and $B_2+$ are connected to ground. Two series connected resistors 18 and 19, preferably of equal value, are connected between the anode lead 15 and the bus bar 10, and the juncture 20 of these two resistors is connected to one terminal 21 of the input circuit. The other terminal 22 of this input circuit is connected to the control grid 5.

The parameters of the circuit parts and voltages $B_1$ and $B_2$ are so selected that the normal, idling voltages on the two grids 2 and 5 are substantially identical, as are the voltages (ground value) appearing on the two anodes 1 and 4. Thus, in typical operation, a potential of zero volts with respect to ground will appear on both anodes 1 and 4, and a grid voltage of minus 100 volts with respect to ground will appear on the two grids 2 and 5. With the voltages on the two anodes 1 and 4 being identical, it is seen that the voltage measured between the terminals 16 and 17 of the output circuit would be zero. Zero adjustment across terminals 16 and 17 may be obtained by shorting the input terminals 21 and 22 and by adjusting the tap 13 on the resistor 8 until the voltages appearing at terminal 16 and at terminal 17 are identical thereby providing a zero difference of potential between these two terminals. Tube V2 draws sufficient current to produce a 100 volt drop across resistor 14 thereby making the value of voltage at terminal 16 zero with respect to ground.

In operation, with the overall circuit adjusted as just described for zero output, a given D. C. signal applied to the terminals 21 and 22 will be amplified and will appear across terminals 16 and 17.

Now considering, as a typical variation in circuit operation, a change in anode 4 voltage, this change will appear across the series resistors 18 and 19. If this change is in the positive direction (potential increase), the total voltage will divide equally across these two resistors, respectively. One half of the voltage increase will thereby be added to the voltage already conducted to grid 5. This grid being made more positive, the D. C. anode resistance of tube section V2 drops thereby tending to counteract the aforementioned increase. This tube section however, now conducts more heavily tending to increase the self-bias developed across resistor 12. But since the cathode resistor 12 is also common to the cathode 3 of the tube section V1, it follows that as the bias on the grid 5 changes, the bias on the grid 2 changes. With the increase of bias applied to the grid 2, the section V1 will become less conductive thereby reducing the voltage appearing across resistor 12 and the bias on grid 5 thus preventing the correcting voltage applied to grid 5 from raising the cathode 6 voltage in a direction which will raise the anode 4 resistance and the anode 4 voltage. The corrective actions of the incremental voltage on grid 5 and of the decreased conductivity of tube V1 thereby serve to counteract and prevent the occurrence of the initial anode 4 potential increase. Tube V1 bears the burden of maintaining the proper bias on grid 5 by conducting more or less heavily than tube V2 with a given bias change applied to the two grids 2 and 5.

Thus it has been shown that with a variation in some feature of the circuitry which may be represented as a change in anode potential on the anode 4, both tube sections V1 and V2 will operate in a sense to maintain the output signal across terminals 16 and 17 constant.

A second example of compensatory action may be explained by considering a change in the emission characteristics of, for example, the cathode 6.

If the heater voltage common to the two cathodes should change, the emission of the cathode will change and assuming an increased emission, current through both tubes increases. Tube V1 conducts more heavily than V2 since it has no plate load resistance and this heavier conduction causes an increased drop across cathode resistor 12. This increased drop produces a heavier bias on grid 5 to reduce conduction of tube V2 thereby counteracting the initial effect of increased cathode emission. Thus it appears, that for heater voltage changes which produce variations in thermionic emission of the cathodes, a compensating network comprising the tube V1 acts oppositely to offset the effects of the changes in emission. With the combination of the negative feedback network (18, 19) and the cathode emission compensating circuit incorporating tube section V1, an inherently stable direct current amplifier circuit is provided which will counteract the effects of changes in both filament and plate voltages, and which will further provide an output impedance, generally fixed by the network 18 and 19, of relatively low value which is important in certain circuit applications.

Of importance is the fact that the aforedescribed circuit while being inherently stable provides high input and low output impedance circuits, repectively. With this arrangement, variations in power consumed by the load connected to terminals 16 and 17 do not serve to alter the voltage across these two terminals since a change tending to lower, for example, the voltage on terminal 16 will initiate the compensating action, previously described, against anode 4 voltage changes.

While it will be understood that the circuit specificationss of the foregoing embodiment of this invention may vary according to design preferences, the following circuit specifications for such a circuit, are included by way of example only, as suitable for a direct current amplifier circuit capable of producing stabilized output signals for given input signals.

| Reference numeral: | | Tube Nos. or part values |
|---|---|---|
| Tube V1, V2 | | 12AU7 |
| Resistor 7 | ohms | 560,000 |
| Resistor 8 | do | 100,000 |
| Resistor 9 | do | 470,000 |
| Resistor 12 | do | 10,000 |
| Resistor 14 | do | 39,000 |
| Resistor 18 | do | 270,000 |
| Resistor 19 | do | 270,000 |

While there has been described what is at present considered the preferred embodiment of the invention, it will be obvious to those skilled in the art that various changes and modifications may be made therein without departing from the invention, and it is therefore, aimed in the appended claims to cover all such changes and modifications as fall within the true spirit and scope of the invention.

What is claimed is:

1. A stabilized D. C. amplifier network comprising a first electron discharge device having anode, control grid, and cathode electrodes, a second electron discharge device also having anode, control grid, and cathode electrodes, the cathodes of both devices being connected together and to one end of a grid bias-developing circuit, means coupled to the grid of said first device and the other end of said grid bias-developing circuit for applying the bias developed by said circuit thereto, a voltage dividing feedback network coupled between the anode of the second device and the other end of said circuit, an input circuit coupled between the grid of the second device and said voltage dividing feedback network so as to have impressed thereon a voltage proportional to the voltage on the anode of the second device, and first circuit means conductively connected directly to the anode of said first device for applying a positive source of potential to the latter and the negative source of the same potential to the other end of said grid bias-developing circuit, output circuit means operatively coupled between the anodes of both devices, and second circuit means including a load impedance for applying a second positive source of potential to the anode of said second device and the negative source thereof to said first circuit means, whereby a given change in bias on both the aforementioned grids will cause a current change in the first device which is greater than the current change in the second device.

2. A stabilized D. C. amplifier network comprising a first electron discharge tube having anode, control grid and cathode electrodes, a second electron discharge tube also having anode, control grid, and cathode electrodes, the cathodes of both tubes being connected together and to one end of grid bias-developing resistor, means coupled to the grid of said first tube and the other end of said grid bias-developing resistor for applying the bias developed by said resistor thereto, a circuit providing a conductive path between the first tube anode and said resistor, a voltage dividing feedback network coupled between the anode of the second tube and the other end of said resistor, an input circuit coupled between the grid of the second tube and said voltage dividing feedback network so as to have impressed thereon a voltage proportional to the voltage on the second tube anode, first circuit means including a load resistor for applying a positive source of anode potential to said second tube anode and the negative source of the same potential to ground, output circuit means operatively coupled between the anodes of both tubes, and means conductively connecting said first tube anode to ground and to a positive source of potential other than the aforesaid anode potential and also to said resistor whereby a given change in bias on both of the aforementioned grids will cause a current change in the first tube which is greater than the current change in the second tube.

3. A stabilized D. C. amplifier network comprising a first electron discharge tube having anode, control grid and cathode electrodes, a second electron discharge tube also having anode, control grid, and cathode electrodes, the cathodes of both tubes being connected together and to one end of grid bias-developing resistor, means coupled to the grid of said first tube and the other end of said grid bias-developing resistor for applying the bias developed by said resistor thereto, a circuit providing a conductive path between the first tube anode and said resistor, a voltage dividing feedback network coupled between the anode of the second tube and the other end of said resistor, an input circuit coupled between the grid of the second tube and to said voltage dividing feedback network so as to have impressed thereon a voltage proportional to the voltage on the second tube anode, circuit means including a load impedance for applying a positive source of anode potential to said second tube anode and the negative source of the same potential to a potential reference circuit, an output circuit coupled between the anodes of both tubes, and means conductively connecting said first tube anode to said potential reference circuit whereby a given bias on both of the aforementioned grids will cause a current in the first tube which is greater than the current in the second tube.

4. A stabilized D. C. amplifier network comprising a first electron discharge tube having anode, control grid and cathode electrodes, a second electron discharge tube also having anode, control grid, and cathode electrodes, the cathodes of both tubes being connected together and to one end of grid bias-developing resistor, means coupled to the grid of said first tube and the other end of said grid bias-developing resistor for applying the bias developed by said resistor thereto, a circuit providing a conductive path between the first tube anode and said resistor, a voltage dividing feedback network coupled between the anode of the second tube and the other end of said resistor, an input circuit coupled between the grid of the second tube and said voltage dividing feedback network so as to have impressed thereon a voltage proportional to the voltage on the second tube anode, circuit means including a load impedance for applying a positive source of anode potential to said second tube anode and the negative source of the same potential to a potential reference circuit, an output circuit coupled between the anodes of both tubes, a source of supply voltage having its positive side connected to said reference circuit and its negative side connected to the other end of said bias-developing resistor, and means conductively connecting said first tube anode to said reference circuit whereby a given bias on both of the aforementioned grids will cause a current in the first tube which is greater than the current in the second tube.

5. A stabilized D. C. amplifier network comprising a first electron discharge tube having anode, control grid, and cathode electrodes, a second electron discharge tube also having anode, control grid, and cathode electrodes, the cathodes of both tubes being connected together and to one end of grid bias-developing resistor, means coupled to the grid of said first tube and the other end of said grid bias-developing resistor for applying the bias developed by said resistor thereto, a circuit providing a conductive path between the first tube anode and said resistor, two series connected resistors coupled between the anode of the second tube and the other end of said resistor, an input circuit coupled between said second tube grid and the juncture of said series connected resistors so as to have impressed thereon a voltage proportional to the voltage on the second tube anode, first circuit means for applying the positive source of a first anode potential to said second tube anode and the negative source of the same potential to a potential reference circuit, output circuit means operatively coupled between the anodes of both tubes, and means conductively connecting said first tube anode to said reference circuit for applying the positive source of a second anode potential to said first tube anode and the negative source thereof to the other end of said grid bias-developing circuit, whereby a given bias on both of the aforementioned grids will cause a current in the first tube which is greater than the current in the second tube.

6. A stabilized D. C. amplifier network comprising a first electron discharge tube having anode, control grid, and cathode electrodes, a second electron discharge tube also having anode, control grid, and cathode electrodes, the cathodes of both tubes being connected together and to one end of grid bias-developing resistor, a first resistance network coupled in series between the grid of said first tube and the other end of said resistor for applying the bias developed by said resistor thereto, a second resistance network coupled in series between said first tube grid and the first tube anode, two series connected resistors coupled between the anode of the second tube and the other end of said resistor, an input circuit coupled between said second tube grid and the juncture of said series connected resistors so as to have impressed thereon a voltage proportional to the voltage on the second tube anode, circuit means including a load resistor for applying a positive source of anode potential to said second tube anode and the negative source of the same potential to ground and an output circuit having one terminal connected to the second tube anode and another terminal connected to ground, the ground reference potential being positive with respect to the other end of said grid bias-developing resistor, said first tube anode being connected to ground whereby a given bias on both of the aforementioned grids will cause a current in the first tube which is greater than the current in the second tube.

References Cited in the file of this patent

UNITED STATES PATENTS

| | | |
|---|---|---|
| 2,505,024 | Wintle | Apr. 25, 1950 |
| 2,550,990 | Gilbert | May 1, 1951 |